WITNESSES:
E. A. McCloskey
New C. Groome

INVENTORS
Richard H. Hagopian and
Milton P. Vore.
BY
F. E. Browder
ATTORNEY

Patented Dec. 30, 1952

2,623,997

UNITED STATES PATENT OFFICE 2,623,997

POWER SYSTEM

Richard H. Hagopian, Halethorpe, and Milton P. Vore, Catonsville, Md., assignors to Westinghouse Electric Corporation, East Pittsburgh, Pa., a corporation of Pennsylvania Application April 15, 1949, Serial No. 87,602

11 Claims. (Cl. 250—27)

1

This invention relates to the timing of the application of electric power to the loads of electric heating systems, and relates more particularly to the timing of the application of radio frequency power to the loads of induction and dielectric heating systems.

In electric heating systems using radio frequency power, it is the practice to move similar load articles in succession, as on a conveyor, through the heating coils of induction heating systems, or between the electrodes of dielectric heating systems, and to apply electric power to each load article for a predetermined period of time. This method is not satisfactory where accurate temperature control is required, since the power input to each article will vary with variation in line voltages, and with the efficiency of the generator, causing one load article to be heated more than another.

This invention provides a timing method in which the power to a load is removed only after a fixed amount of energy has been applied to the load, and is based upon the theory that the power into a load heated in an induction or dielectric heating system, varies with the square of the change in voltage across the load.

Similar load articles would cause the same voltage drops across a load circuit when heated the same amount. The voltage drop caused by the heating of a typical load article, the desired amount, is determined, and used to actuate the controls for timing the application of power to the other load articles.

In one embodiment of the invention, current from the load circuit is rectified and used to charge a capacitor. A thyratron tube is normally biased to cut-off, with its cathode at ground potential. As the capacitor is charged by an increase in the radio frequency voltage across the load circuit, it biases the cathode of the thyratron negatively with respect to its grid, and when the voltage across the load circuit has increased the amount which indicates the load article to be fully heated, the thyratron tube conducts and energizes a solenoid which removes power from the generator.

When the capacitor charge falls below the firing voltage of the thyratron, its grid takes control and blocks the tube so that it is ready for the next firing cycle. When the next article to be heated is in heating position, a switch is closed manually or by conveyor movement, and re-applies power to the generator, and the control cycle is repeated.

An object of the invention is accurately to control the electric power used in electrically heating an article.

Another object of the invention is to time the application of electric heat to an article in accordance with the electric power absorbed by the article.

2

Another object of the invention is to time the application of electric heat to an article in accordance with the change in voltage across the heating circuit.

The invention will now be described with reference to the drawing, of which:

Figure 1:
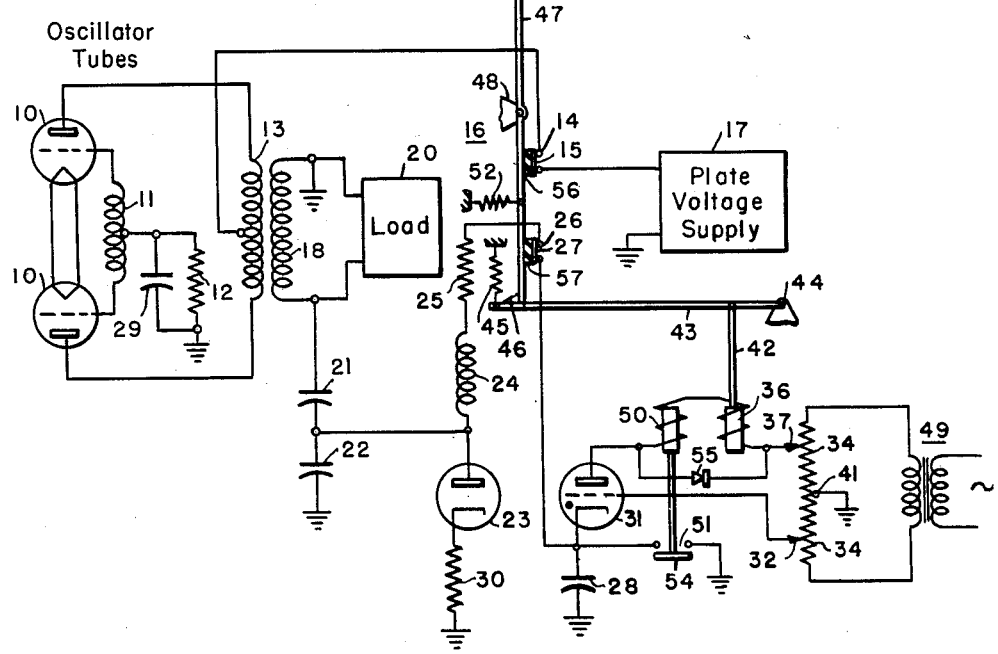
Fig. 1 is a circuit schematic illustrating one embodiment of the invention.

Referring now to Fig. 1, the push-pull connected oscillator tubes 10 have their grids connected to the opposite ends of the inductor 11, the center point of which is connected through the grid leak 12 to ground. The capacitor 29 is connected across the leak 12. The plates of the tubes are connected to the ends of the tank inductor 13, the center point of which is connected through the contacts 14 and 15 of the switch 16 to the positive terminal of a conventional plate voltage supply source 17, the negative terminal of which is grounded. The load circuit inductor 18 is inductively coupled to the tank inductor 13, and is connected to the load 20 which may include a work article to be heated by dielectric heating or by induction heating, together with the conventional load circuit connections therefor. One end of the inductor 18 is grounded and its other end is connected through the series-connected, voltage dividing capacitors 21 and 22 to ground. The junction point of the capacitors is connected to the plate of the diode rectifier tube 23, which also is connected through the series-connected, radio frequency choke 24, the resistor 25, the contacts 26 and 27 of the switch 16, and the capacitor 28 to ground. The cathode of the tube 23 is connected through the bias resistor 30 to ground.

The ungrounded side of the capacitor 28 is connected to the cathode of the thyratron tube 31, the grid of which is connected to the slider 32 of the resistor 34, and the plate of which is connected through the energizing windings of the series-connected relay 50 and solenoid 36 to the slider 37 of the resistor 34. The resistor 34 is shunted across the secondary winding of the transformer 49, the primary winding of which is connected to a conventional alternating current source. The resistor 34 has an intermediate tap 41 which is grounded.

The cathode of the tube 31 and the ungrounded side of the capacitor 28 are connected to the armature 54 of the relay 50, which is adapted to strike the grounded contact 51 when the relay is energized.

The plunger 42 of the solenoid 36 is connected to the lever 43 of the switch 16 intermediate its ends. One end of the lever is pivoted at 44, and its other end is connected to the spring 45 which biases it upwardly (facing the drawing). The end of the lever adjacent the spring 45, has an upwardly extending latch 46 which contacts the lower end of the switch arm 47 which is pivoted at 48 intermediate its ends. The lower end of the switch arm is forced against the latch 46 by the spring 52. The switch arm has thereon the insulator blocks 56 and 57 on which are mounted the switch contacts 15 and 27 respectively.

The switch 16 is adapted to be closed at the beginning of each cycle by the movement of the upper end of the switch arm 47 in a counter-clockwise direction. This can be done manually by an operator or can be done through the movement of a conveyor which carries articles to be heated through the system. The switch 16 is adapted to be opened by the energization of the solenoid 36 when the required amount of power has been applied to the load article being heated, as will be described.

In operation, current from the load circuit is rectified by the tube 23, and the rectified current having a negative polarity is supplied through the choke 24, the resistor 25 and the contacts 26 and 27 of the switch 16, to charge the capacitor 28, which, as its charge builds up, biases the cathode of the thyratron tube 31 negatively with respect to its grid. This tube is normally biased to cut-off with its grid at ground potential.

An increase in radio frequency voltage across the load causes the capacitor 28 to charge up at a rate which depends upon the time constant of its circuit, and the radio frequency voltage. Since the time constant of the circuit is fixed, the voltage to which the capacitor 28 is charged during the heating cycle, will be proportional to the integrated radio frequency voltage across the load. The capacitor will be charged to the firing voltage of the tube 31 when the ratio frequency voltage across the load reaches a predetermined value which can be determined from a test run on a typical work article. The contact sliders 32 and 37 of the resistor 34 can be used to adjust the bias on the grid of the tube 31.

When the tube 31 fires, its plate current energizes the solenoid 36 which then retracts its plunger 42 which moves the lever 43 downwardly, releasing the switch arm 47, the lower end of which is then moved to the left by the spring 52, causing the contact 27 to separate from the contact 26, and causing the contact 15 to separate from the contact 14.

The separation of the contacts 27 and 26 by the energization of the solenoid 36 opens the circuit between the rectifier tube 23 and the capacitor 28 thus preventing any charging of the capacitor until the switch 16 is closed. This prevents possible current flow through the rectifier tube 23 from preventing the tube 31 from being blocked again after the capacitor 28 is discharged. This provision for opening the charging circuit of the capacitor 28 may not be necessary when the sum of the values of the resistors 25 and 30 is high as is usually the case.

The separation of the contacts 14 and 15 by the energization of the solenoid 36, opens the circuit connecting the plate voltage supply source 17 to the plates of the oscillator tubes 10, thereby removing power from the radio frequency generator, and discontinuing the supply of heat to the load article being heated. Other conventional methods of removing the radio frequency power may be used.

When the tube 31 conducts and energizes the solenoid 36, it also energizes the relay 50 which then pulls in its armature 54 causing it to strike the contact 51 and to short-circuit the capacitor 28 thus ensuring its complete discharge before the beginning of the next heat cycle. The negative bias on the grid of the tube 31 is thus reduced until its grid takes hold and blocks the tube on a negative swing of its plate.

The circuit may also include the solenium rectifier 55 connected across the energizing windings of the relay 50 and solenoid 36, and which acts to smooth out the ripples due to the half-wave rectification of the tube 31.

The voltage across the capacitor 28 will depend upon the voltage across the rectifier tube 23, and upon the rate of change of current through the capacitor. By proper selection of the value of the capacitor, and of the values of the resistors 25 and 30, a small change in voltage across the load circuit will cause the time required for the capacitor to charge to a predetermined voltage, to vary as the square of the change of voltage across the load.

Figure 2:
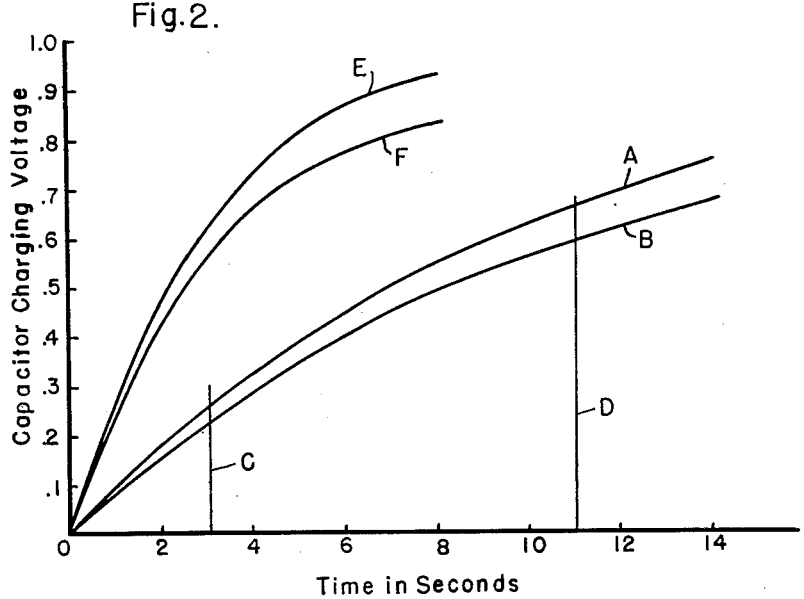
Fig. 2 is a chart illustrating the timing characteristics of the system of Fig. 1.

Fig. 2 is a chart having time in seconds as abcissae, and condenser charging voltages as ordinates, and illustrates by the curve A, a condenser charging, characteristic curve where $RC=10$, where R is the combined resistances of the resistors 25 and 30 in ohms, and C is the capacity of the capacitor 28 in microfarads. The curve B is a corresponding characteristic curve but with the voltage reduced by 10%. In the region between the vertical lines C and D, a change in voltage across the load results in a condenser charging time which varies as the square of the change in voltage. The curve E is a characteristic curve where $RC=3$ and is shown for the purpose of comparison. The curve F is a curve corresponding to the curve E but with the voltage reduced 10%.

The curve A where $RC=10$, covers a time scale of 14 seconds. By reducing RC to a value of 1, instead of 10, and by dividing the abscissa scale of Fig. 3 by 10, the curve A can be used to cover a time scale of 1.4 seconds. This curve would be useful for timing induction heating cycles where the periods of heating are usually less than one second each.

Assuming the illustrated system is to be used with a conveyor carrying spaced work articles to be heated in succession, through the load circuit, when one article is heated the required amount, the solenoid 36 is energized so that the heating power is cut off. The conveyor then moves the heated article from the work circuit, and places the next article to be heated therein. Then the switch 16 is closed manually by an operator of the system or automatically through movement of the conveyor, thereby closing the circuits for again applying power to the generator, and for again placing the capacitor 28 in condition to be charged.

We claim as our invention:

1. A timing system for an alternating current generator supplying electric power to a load circuit for heating a load article, comprising a gaseous electron tube having a control grid, a cathode and an anode, means connected to said anode for discontinuing the supply of power by said generator to said circuit when said tube conducts, means normally biasing said grid to cut-off, and means responsive to voltage changes across said circuit for biasing said cathode negatively with respect to said grid until said tube conducts when a predetermined amount of energy has been delivered to said load article.

2. A timing system as claimed in claim 1 in which the last-mentioned means includes a capacitor connected to said cathode, and includes a rectifier and resistance in series with said capacitor, said rectifier being connected to receive voltage proportional to the load voltage, for charging said capacitor.

3. A timing system for an alternating current generator suplying electric power to a load circuit for heating a load article, comprising means for discontinuing the supply of power by said generator to said circuit, means including an electron discharge device having a control electrode for actuating said first mentioned means, means for obtaining a voltage which is proportional to the load voltage, a capacitor, a rectifier, and a resistance, serially connected, means for applying said voltage to said rectifier to cause current flow through said resistance and capacitor, and means connecting said capacitor in the control grid circuit of said discharge device, whereby the rate of charge of said capacitor is a function of the load voltage and said discharge device will conduct to open the load circuit only when a predetermined amount of energy has been delivered to the load article.

4. A timing system for a generator supplying electric power to a load circuit for heating a load article, comprising an electron discharge device having a control grid, a cathode and an anode, means connected to said anode for discontinuing the supply of power by said generator to said circuit when said tube fires, means normally biasing said grid to cut-off, a capacitor, a rectifier, and a resistance, serially connected, means for obtaining a voltage which is proportional to the load voltage, means for applying said voltage to said rectifier to charge said capacitor, and means connecting said capacitor in the grid-cathode circuit of said discharge device, whereby the rate of charge of said capacitor is a function of the load voltage and said discharge device will conduct when a predetermined amount of energy has been delivered to said load article.

5. A timing system as claimed in claim 4 in which means is provided for disconnecting said capacitor from said rectifier following the conduction of said discharge tube.

6. A timing system as claimed in claim 4 in which means is provided for short-circuiting said capacitor following the conduction of said discharge tube.

7. A timing system as claimed in claim 4 in which means is provided for disconnecting said capacitor from said rectifier, and for short-circuiting said capacitor following the conduction of said discharge tube.

8. A timing sytem for an alternating generator supplying electric power to a load circuit for heating a load article, comprising a gaseous electron tube, having a grid, a cathode, and an anode, a power supply source for said tube, a switch for discontinuing the supply of power by said generator to said circuit, means connected to said source and to said anode for opening said switch when said tube fires, means normally biasing said grid to cut-off, a capacitor, a rectifier and a resistance, serially connected, means for obtaining a voltage which is proportional at all times to the load voltage, means for applying said voltage to said rectifier to cause current flow through said resistance to charge said capacitor, and means connecting said capacitor in the grid-cathode circuit of said tube, the relative magnitude of said resistance and capacitor being such as to cause the charging characteristic of the capacitor to be non-linear, whereby said tube will fire when a predetermined quantity of energy has been delivered to said load article.

9. A timing system as claimed in claim 8 in which means is provided for disconnecting said capacitor from said rectifier when said tube fires, and for again connecting said capacitor to said rectifier following the closing of said switch.

10. A timing system as claimed in claim 8 in which means is provided for placing a short-circuit across said capacitor when said tube fires, and for removing said short-circuit when said switch is closed.

11. A timing system as claimed in claim 8 in which means is provided for disconnecting said capacitor from said rectifier and for placing a short-circuit across said capacitor when said tube fires, and means is provided for again connecting said capacitor to said rectifier, and for removing the short-circuit from said capacitor when said switch is closed.

RICHARD H. HAGOPIAN.
MILTON P. VORE.

REFERENCES CITED

The following references are of record in the file of this patent:

UNITED STATES PATENTS

| Number | Name | Date |
| --- | --- | --- |
| 2,292,137 | Livingston | Aug. 4, 1942 |
| 2,295,297 | Schneider | Sept. 8, 1942 |
| 2,304,207 | Richardson | Dec. 8, 1942 |
| 2,436,872 | Smith | Mar. 2, 1948 |
| 2,453,486 | Ball | Nov. 9, 1948 |
| 2,491,428 | Tellier | Dec. 13, 1949 |